W. M. DECKER.
SPRING SHADE ROLLER.
APPLICATION FILED JAN. 6, 1909.
985,327.
Patented Feb. 28, 1911.
2 SHEETS—SHEET 1.
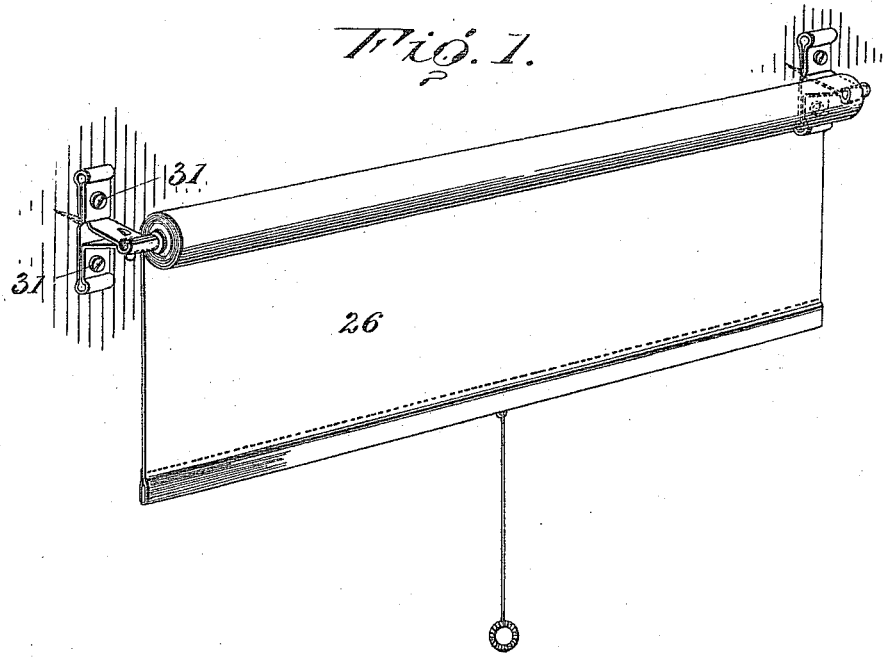
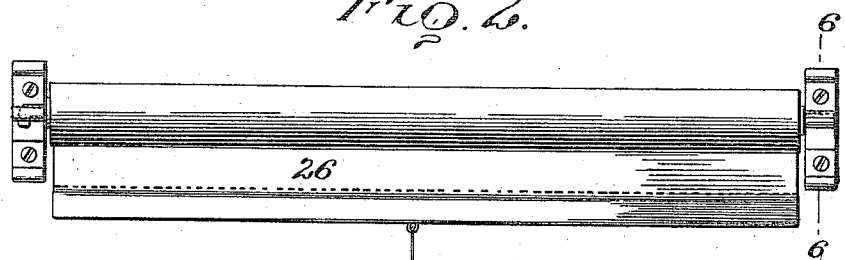
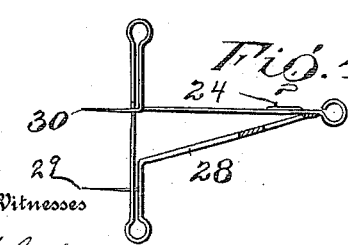
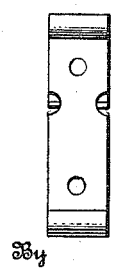
Inventor
William More Decker W. M. DECKER.
SPRING SHADE ROLLER.
APPLICATION FILED JAN. 6, 1909.
985,327.
Patented Feb. 28, 1911.
2 SHEETS—SHEET 2.
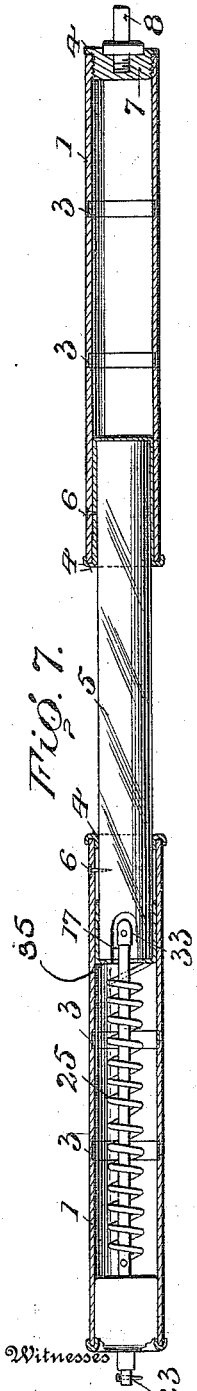
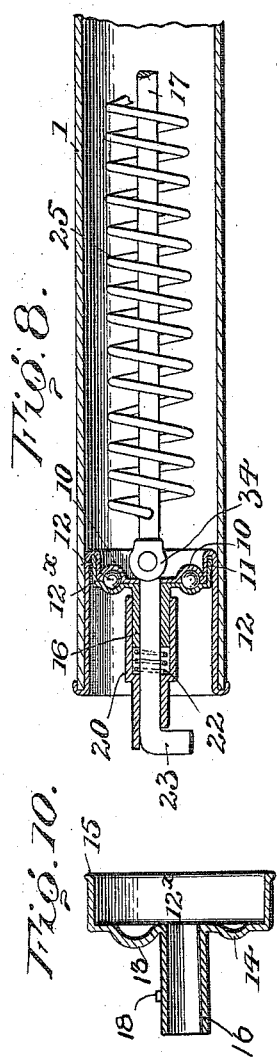
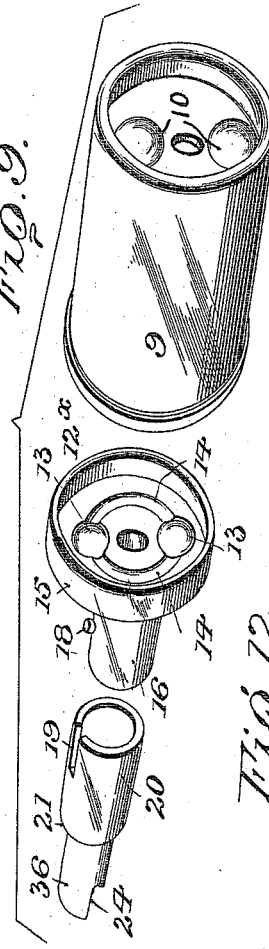
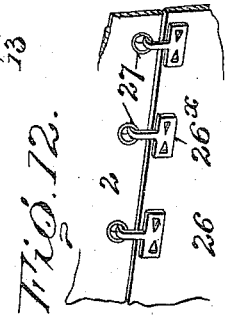
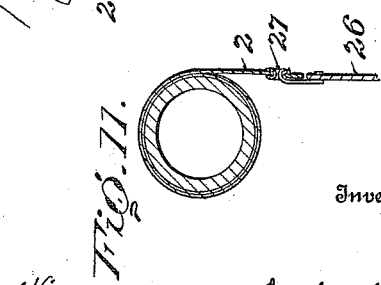
Inventor
William More Decker

UNITED STATES PATENT OFFICE.

WILLIAM MORE DECKER, OF BUFFALO, NEW YORK.

SPRING SHADE-ROLLER.

985,327. Specification of Letters Patent. Patented Feb. 28, 1911.

Application filed January 6, 1909. Serial No. 470,987.

*To all whom it may concern:*

Be it known that I, WILLIAM MORE DECKER, a citizen of the United States, residing at Buffalo, in the county of Erie and State of New York, have invented certain new and useful Improvements in Spring Shade-Rollers; and I do hereby declare the following to be a full, clear, and exact description of the invention, such as will enable others skilled in the art to which it appertains to make and use the same.

My invention relates to certain new and useful improvements in spring rollers for shades, and has for its objects to provide a roller which shall be light of weight, economical of construction, readily adjusted to window frames of varying width and having means for ready and accurate attachment of shades.

My invention also has for its object to provide novel means for controlling the spring action of the roller and locking it in position when desired.

With these ends in view my invention consists in the details of construction and arrangement of parts hereinafter more fully described and claimed.

In order that those skilled in the art to which my invention appertains may make and use the same, I will proceed to describe the construction and operation of the same, referring to the accompanying drawings in which:

Figure 1 is a perspective view of a roller in position with the shade attached; Fig. 2, a front view of the same; Fig. 3, a detail view of one of the brackets for supporting the roller in position; Fig. 4, an end view of the same bracket; Fig. 5, a back view of the same; Fig. 6, a detail view partly in section of the other bracket and showing the roller rod in position therein. Fig. 7 is a horizontal section partly in elevation of the roller. Fig. 8 is an enlarged section of the left-hand end of the roller, as shown in Fig. 7. Fig. 9 is a detail perspective view on enlarged scale of the parts surrounding the spring rod. Fig. 10 is a side sectional view of the cap for the cup shaped ball receiver. Fig. 11 is a cross-section through the roller surrounding the spring rod; and Fig. 12 is a detail perspective view illustrative of the devices for attaching the shade to the roller.

Similar reference numerals indicate like parts in the several figures of the drawings.

1, 1, are two tubular sections which are preferably composed of straw board or other suitably strong paper wound upon itself to secure proper strength and rigidity, or of sheet metal secured in any suitable manner, and with a strip of textile material 2, secured thereon. Strengthening ring-shaped ribs 3, may be located within the tubular sections if desired. The ends of the tubular sections 1, are reinforced by flanged metal rings 4, which constitute a neat finish of the ends, and preserve the cylindrical form of the sections.

5, is a cylinder of wood adapted to be received within the adjacent ends of the two tubular sections 1, 1, as clearly shown in Fig. 7, and to be adjustably secured therein by tacks 6, or in any other suitable manner.

Within the outer end of one of the tubular sections, 1 is secured a block 7, within which is axially secured a trunnion 8. Within the outer end of the other tubular section is secured a cup-shaped sheet metal ball receiver 9, the outer end of which is flanged over the edge to constitute a finish thereto, as clearly shown. The inner end of this ball receiver is formed as most clearly shown at Fig. 8, with a plurality of antifriction ball recesses, 10, surrounded by a tapered wall 11, and antifriction balls, 12, are located within the ball recesses, 10.

$12^\times$ is a sheet metal cap or ball confining plate provided with ball recesses 13, similar to the recesses 10, but not so deep, and with connecting grooves or tracks 14, and with a surrounding wall 15, having its edge tapered for frictional contact with the tapered wall of the cup-shaped ball receiver 9, as clearly shown at Fig. 8. This sheet metal cap is formed with a tubular neck or shank 16, through which the spring rod 17, passes, and which rod also passes through a central opening in the cup-shaped ball-receiver 9, as clearly shown. The shank 16, is provided with a radial stud or spline 18, adapted to enter a longitudinal slot 19, in a tubular sleeve 20, which surrounds the spring rod 17. This tubular sleeve 20, is reduced or stepped at 21, to produce a shoulder between which and the end of the shank 16, of the cap $12^\times$ is located a spiral spring 22, which acts to hold the cap in contact with the balls 12. The outer extremity of the reduced end of the sleeve 20, is formed with a radial slot 24, through which the vertically disposed end 23, of the spring rod 17, passes, and which while permitting a slight reciprocating movement of the sleeve 20, prevents any rotative movement of the same.

One end of the spring rod is located in a recess in the inner end of the wooden cylinder 5, and the spring 25, for actuating the roller is connected at one end to the wooden cylinder and at the opposite end to the spring rod in the usual manner and as clearly shown in Fig. 7.

The shade 26 is secured to the fabric 2, by means of sheet metal hooks 26ˣ, secured to the shade, and eyelets 27, in the fabric as shown at Fig. 12, or in any other desired manner.

28, is the right-hand bracket designed to receive and support the trunnion 8, of the roller, and is constructed of sheet metal as clearly shown in Figs. 3, 4 and 5, folded upon itself and secured against movement with respect to itself and to the window frame, by barbs 29 and 30, but if additional security should be desired ordinary screws or nails 31, may also be used. The left-hand bracket 32, is folded upon itself in a similar manner, and held in position by similar barbs, but the outer or supporting extremity in which the opposite end of the spring rod 17, is held, is formed as shown at Fig. 6, open at the top to receive the horizontal portion of the end of the spring rod, and with a vertical opening for the passage of the returned or right-angle end 23, of the same, whereby said rod is held against rotation.

The detail construction of the brackets of sheet metal will not be claimed herein, as I contemplate making them the subject-matter of another application for Letters Patent.

Having described the construction and arrangement of the several parts of my improved spring shade roller, I will now explain the operation of the same and as shown in Fig. 7.

When the shade has been duly wound upon the roller and the latter has been located upon the brackets, and it is desired to lower the shade, the same is pulled down, which action causes the roller to rotate upon the spring rod 17, and in doing so the anti-friction balls 12, force the sheet metal cap 12ˣ outward against the spring 22, permitting the balls to remain and rotate freely within their recesses in the cup-plate while the circular grooves 14 in the cap 12ˣ traverse upon said balls in an obvious manner, until the rotation of the roller is retarded; whereupon the spring 22, will press the cap plate toward the cup-shaped plate, and as the inclined edge of the cap plate gradually and progressively comes into frictional contact with the wall 11, of the cup-shaped plate, it will act as a brake and the balls 12, will be brought to a state of rest and constitute a lock when the ball recesses in the two plates are in line.

To release the lock, a sudden pull downward upon the shade will cause the balls to force the cap plate 12ˣ outward against the pressure of the actuating spring 22, thus permitting the roller and the cup-shaped plate to rotate as above explained.

The end 23, of the spring rod 17, instead of being turned down at a right angle as shown to enter a vertical slot or opening in the supporting bracket, may be provided with a peg or pin passing through the rod in an obvious manner, as a substitute.

While I contemplate making the tubular sections 1, 1, of straw-board or paper, with the longitudinal edges overlapped and secured in any suitable manner to embrace the fabric 2, it will be appreciated that such specific structure is not material, and any suitable material and structure thereof may be employed to which the shade is to be attached. One end of the spring rod 17, is formed or provided with a spherical or rounded end 33, which is seated in a suitable pocket in the end of the wooden cylinder as clearly shown, in order that the same may freely rotate around said rod, and the opposite end of the rod is provided with a similar end piece 34 (see Figs. 7 and 8), which is a separate piece secured in position on the rod 17, and the rod as clearly shown constitute a guard which prevents any undue endwise movement of the rod 17, by its contact under such circumstances with the cup-shaped plate 9.

The end of the wooden cylinder 5, to which one end of the spring 25, is secured, is provided with a sheet metal cap 35 (see Fig. 7) which serves to securely hold the end of the spring 25.

It will of course be understood that the length of the cup-shaped plate, or the distance it may enter the end of the tubular section 1, and in fact the proportions of the several parts may be varied without departing from the spirit of my invention, and that the limit of the longitudinal adjustment of the sections 1, 1, upon the wooden cylinder 5, will necessarily be within reasonable limits.

From the description herein given it will be seen that the rotation of the roller is upon ball bearings and consequently there will be a minimum degree of frictional wear, and that the several parts which coöperate to control the rotation of the roller are simple and economical of construction and may be readily made by suitable dies from sheet steel. The character of the ball recesses in the cup-shaped plate or receiver 9, are such that the balls will not be dislodged therefrom and will constitute not only anti-friction bearings for the cap-plate 12ˣ, but will also serve when the rotation of the roller has been duly retarded or slowed down, as a lock to hold the roller in fixed position under the action of the spiral spring 22.

The strip of fabric 2, having been secured to the roller, as described, it will be readily seen that when the shade is attached thereto by means of the hooks and eyelets or other similar means, that the shade will travel upon the roller in an even manner, and that if strain should be exerted upon the shade after it has reached the limit of its vertical travel, the character of its connection with the roller is such that it will not be torn away from the same, as is the case where the shade is tacked to the roller; also, it will not become detached when the shade is pulled all the way down.

With the tubular sections connected by the wooden cylinder 5 entering their adjacent ends, it will be obvious that a roller embodying my invention may be adjusted within reasonable limits to window frames of varying lengths, and that as the wooden cylinder enters each of the tubular sections a given distance, such cylinder constitutes a means in itself, and independent of the ring-shaped ribs 3, for bracing the tubular sections against any tendency to collapse.

It will be seen that, as the major part of the roller is composed of the two tubular sections connected by a comparatively short cylinder of wood, the weight of the entire roller is materially lessened over one composed mainly of wood.

Having thus described the construction, operation and advantages of my improved roller, what I claim as new and desire to secure by Letters Patent is:—

1. A shade roller such as described involving two tubular sections connected by an intermediate cylinder of wood, and provided with a spring rod and coil spring, a cup-shaped ball receiver located in the outer end of one of the tubular sections and surrounding the spring rod, and provided with a plurality of ball recesses, in combination with a cap plate surrounding the spring rod, provided with ball recesses connected by circular grooves; anti-friction and locking balls located in the ball recesses of the ball-receiver, and yielding means for holding the cap plate in contact with the balls, substantially as and for the purpose set forth.

2. A shade roller, composed of two tubular sections adjustably connected by an intermediate cylinder of wood and provided with a central spring rod; a cup-shaped ball receiver having ball recesses therein located in the outer end of one of the tubular sections; balls located within the recesses in the cup-shaped ball-receiver; a cap plate having ball recesses connected by circular grooves and formed with a hollow axial shank, located within the cup-shaped ball receiver; a sleeve located upon the spring rod and secured against rotary movement thereon, and formed with an interior annular shoulder and with a longitudinal kerf or slot in its inner extremity; a spring located between the end of the shank on the plate and the annular shoulder of the sleeve; and a stud or spline on the shank of the cap plate entering the kerf or slot in the sleeve, whereby the cap plate is held in yielding contact with the balls, substantially as and for the purpose set forth.

3. A shade roller such as described, provided with a central spring rod and actuating spring, and provided at one end with a cup-shaped ball receiver having a plurality of ball recesses; balls located in the recesses of the cup-shaped ball receiver, a longitudinally movable plate provided with ball recesses connected by circular grooves; and yielding means for holding the plate in locked relation with the ball receiver when the roller is at rest, substantially as hereinbefore set forth.

4. A shade roller such as described, provided with a ball receiver on one end thereof having ball recesses therein, a cap plate adapted to a yielding reciprocating movement, said ball receiver having a groove connecting the ball recesses, and said cap plate having a circumferential tapered wall whereby frictional contact with the ball receiver may be effected, substantially as described.

5. In a shade roller such as described, with a cup shaped ball receiver at one end thereof and with ball recesses therein; a ball retaining cap plate adapted for yielding reciprocating movement, said ball retaining cap plate formed with a groove connecting the ball recesses; and said ball retaining cap plate formed with a circumferential tapered wall, whereby frictional contact may be effected, substantially as described.

In testimony whereof, I have signed my name to this specification in the presence of two subscribing witnesses.

WM. MORE DECKER.

Witnesses:
WILSON FRANKLIN STURM,
RUTH E. ALLEN.